Jan. 2, 1940. W. W. LASKER 2,185,260
TABULATING MACHINE
Filed March 5, 1936 6 Sheets-Sheet 1

FIG.1

WITNESSES

INVENTOR
W. W. LASKER
BY
HIS ATTORNEY

Jan. 2, 1940. W. W. LASKER 2,185,260
TABULATING MACHINE
Filed March 5, 1936 6 Sheets-Sheet 5

WITNESSES

INVENTOR
W. W. LASKER
HIS ATTORNEY

Jan. 2, 1940.　　　W. W. LASKER　　　2,185,260
TABULATING MACHINE
Filed March 5, 1936　　　6 Sheets-Sheet 6

WITNESSES

INVENTOR
W. W. LASKER
BY
HIS ATTORNEY

Patented Jan. 2, 1940

2,185,260

UNITED STATES PATENT OFFICE 2,185,260

TABULATING MACHINE

William W. Lasker, Brooklyn, N. Y., assignor to Remington Rand Inc., Buffalo, N. Y., a corporation of Delaware Application March 5, 1936, Serial No. 67,215

4 Claims. (Cl. 235—61.9)

This invention relates to record card controlled tabulating machines and particularly to an alphabetic and numerical tabulating unit therein combined with accumulating mechanism.

In a tabulating machine of the type disclosed in the patent to Powers 1,245,502, granted November 6, 1917, known as a forty-five column tabulator, it has been customary to print and accumulate numerical data from record cards punched according to a single unit code to indicate the desired digit, the digit being represented by the perforation position in a vertical column of twelve possible perforations. Alphabetic characters may be printed in a tabulator of this type by utilizing a type carrier similar to that described in the patent to Foster 1,274,528, granted August 6, 1918, in conjunction with a combination perforation code. In this arrangement the printing of certain alphabetic characters is controlled from a single perforation in a card column, whereas the printing of others is controlled by two perforations. By means of the modification disclosed in applicant's Patent 1,780,621, granted November 4, 1930, the capacity of such machines was increased insofar as numerical tabulation was concerned by dividing the record card into two zones, each containing six perforation positions and providing a numerical stop basket operable from either zone in accordance with a two unit code. However, applicant is not aware of any alphabetic printing system operable from either zone of a standard record card that might be incorporated satisfactorily with the Powers tabulator.

Furthermore, in the construction of tabulating machines, the general custom has been to provide seven tabulating units, two of which were equipped with alphabetic types, the remaining five with numeral types and means to accumulate numerical quantities. However, dissimilar accounting systems adapted to the particular requirements of various industries often necessitate differing proportions in the arrangement of these units. In fact, due to the multiple functions a tabulating machine may perform, this condition frequently arises within the same office. Since the above described set-up cannot be changed to comply with varying circumstances without loss of time and additional expense, the need for a more flexible tabulating unit is apparent.

The present invention provides a combined alphabetic and numeral type positioning and accumulating unit operable from a multi-unit code that may be represented by perforations in either the upper or lower zone of a record card. This unit is especially adapted to function as a designating unit in conjunction with the standard Powers tabulator now in general use, or may be substituted for the usual numerical computing unit therein. In certain accounting problems it is necessary to provide an alphabetic designation, whereas in others, a numerical designation may be required. Either requirement is readily fulfilled by this invention and in addition thereto, the numerical characters may be tabulated and concomitantly accumulated should the exigencies of a particular accounting problem so require. Furthermore, the capacity of a tabulator, operable from standard record cards and equipped with units of this type, would be increased to the extent that ninety columns of information may be printed simultaneously on a report sheet exclusive of duplicated information that could be printed by means of wye-wired controls.

This application is a continuation in part of my copending application S. N. 684,438, filed August 9, 1933.

The object of this invention is to increase the capacity and flexibility of tabulating machines.

Another object of this invention is to provide an improved type carrier positioning mechanism combined with accumulating mechanism.

Another object of this invention is to provide means to print alphabetic and numeral characters selectively or interchangeably and in either case, concomitantly accumulate the numerical values.

Another object of this invention is to provide means to print alphabetic and numeral characters interchangeably in a given column of a report sheet.

Another object of this invention is to provide an improved designating unit for tabulating machines.

Another object of this invention is to provide a combined alphabetic and numerical designating unit operable from either zone of a standard record card.

Another object of this invention is to provide an improved stop basket mechanism capable of setting a type carrier in a plurality of positions greatly in excess of the number of perforation positions contained in a record card.

Other objects of this invention and details of the structure will be apparent from the following description when read in conjunction with the accompanying drawings, in which.

General description of operation

Figure 1:
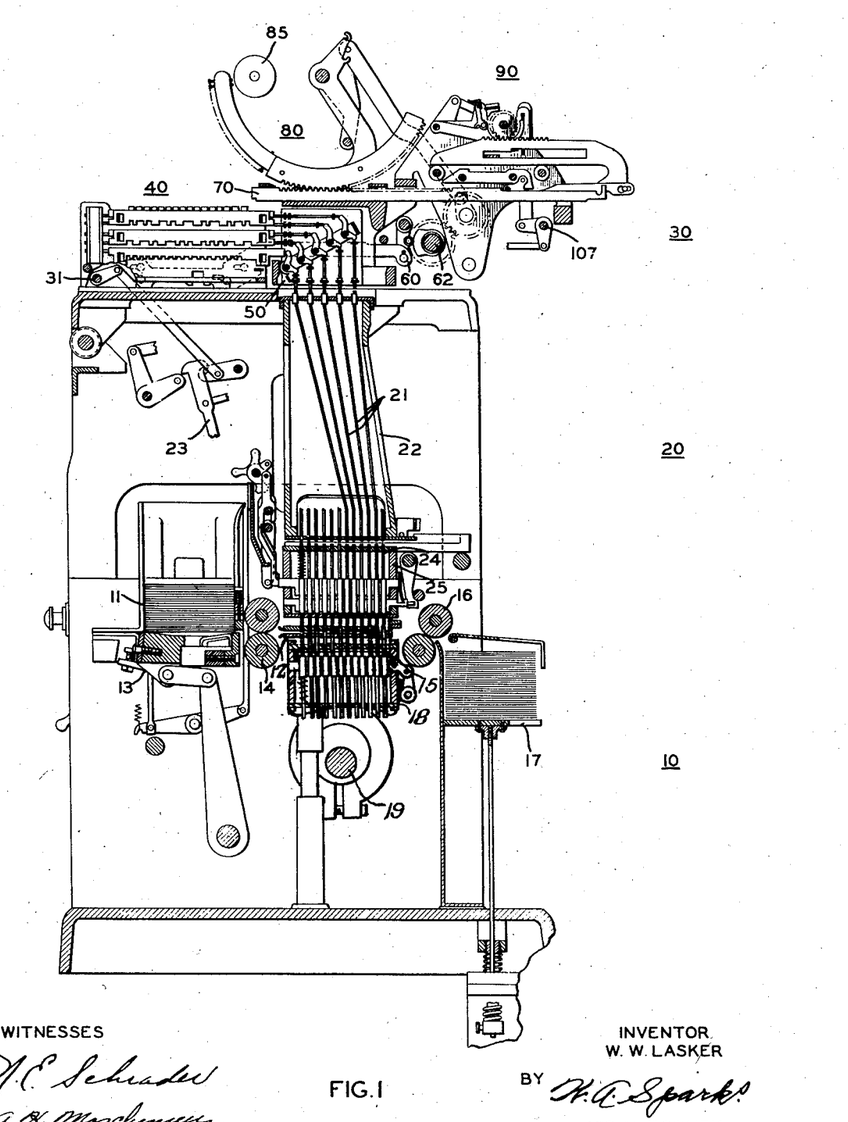
Fig. 1 is a conventional front to rear sectional view through a Powers tabulator equipped with the invention.

The embodiment of the invention, shown in Fig. 1, includes broadly a base component 10, a translating component 20, and a computing component 30. Record cards, placed in a card magazine 11, are passed seriatim into a sensing chamber 12 by means of picker mechanism 13 and feed rollers 14. After being sensed by pins 15, the cards are ejected by rollers 16 into a receiving magazine 17. The sensing pins are mounted in a pin box 18 that is reciprocated by a cam arrangement conventionally shown on drive shaft 19. Pins that sense perforations in a record card move upwardly relative to pins that do not sense perforations, due to an arrangement of springs, slides, and latches in the pin box. Pins that pass through perforations in a card elevate pins 24, set in an intermediate pin box 25, and thereby elevate translator wires 21, slidably mounted in translator basket 22.

The translator wires 22 (Fig. 2) impart motion to code bars mounted in a stop basket 40 through a change of direction mechanism mounted in frame 50. When the code bars are set according to the perforations in a sensed card, a plurality of spring urged stop bars 43 are released by means of a slide 60 (Fig. 7) actuated by cam 61 fixed on computing head drive shaft 62. One of the stop bars will then be elevated in accordance with the setting of the code bars to arrest the forward motion of rack 70.

Rack 70 may be obstructed in any of a plurality of positions in either of two ranges of positions according to the stop bar that has been raised. When stopped in the first or alphabetic range, the rack serves to position the type carrier so that an alphabetic character may be printed on a report sheet (not shown) supported by platen 85. When stopped in the second or numerical range, the rack sets the type carrier to printing position for a numerical character and concomitantly actuates an auxiliary rack 92 (Fig. 4) to cause an accumulation of the quantity in a totalizer wheel 91.

The foregoing brief description of operation will serve to illustrate the mechanical cooperation between the several mechanisms comprising the present invention and the particular portion of a Powers tabulator that may act in conjunction therewith.

The base component shown herewith is an integral part of standard Powers construction and consists essentially of driving means, card feeding mechanism, card sensing mechanism and total taking control mechanism. These devices are well known in the art and are fully disclosed in copending application S. N. 538,429 filed May 19, 1931, now Patent No. 2,044,119, granted June 16, 1936. Since they do not form a part of the present invention they are not shown in detail herein. The translator basket is also a well known device whereby the motion of the sensing pins may be transmitted to set stops in the stop basket.

Type carrier and controls

The type carrying mechanism 80 (Fig. 2) is a modification of that used in the usual Powers construction. In the present case, a type carrying sector 81, pivotally mounted on shaft 89, is rigidly attached to a gear sector 82. The sector 81 is provided with slots to accommodate thirty-two types. The types are divided into an alphabetic range and a numerical range. The alphabetic characters occupy the first twenty-three positions (in the order of presentation to printing position) on the type sector and may be arranged in any order thereon, the only limitation being that the character "O" shall occupy the twenty-third position. The entire alphabet may be represented on the twenty-three types by combining two characters on one type in a manner well known in the art, that is, "U" and "V" may be represented by a single symbol as would "X" and "Z"; "Y" and "W". The numerical range occupies the last nine positions on the sector. The numeral "1" is in the first position immediately following the last character in the alphabetic range. The remaining numeral characters are arranged thereafter in ascending order. Thus it will be seen that the type character "O" may represent either a cipher or an alphabetic character.

Figure 2:
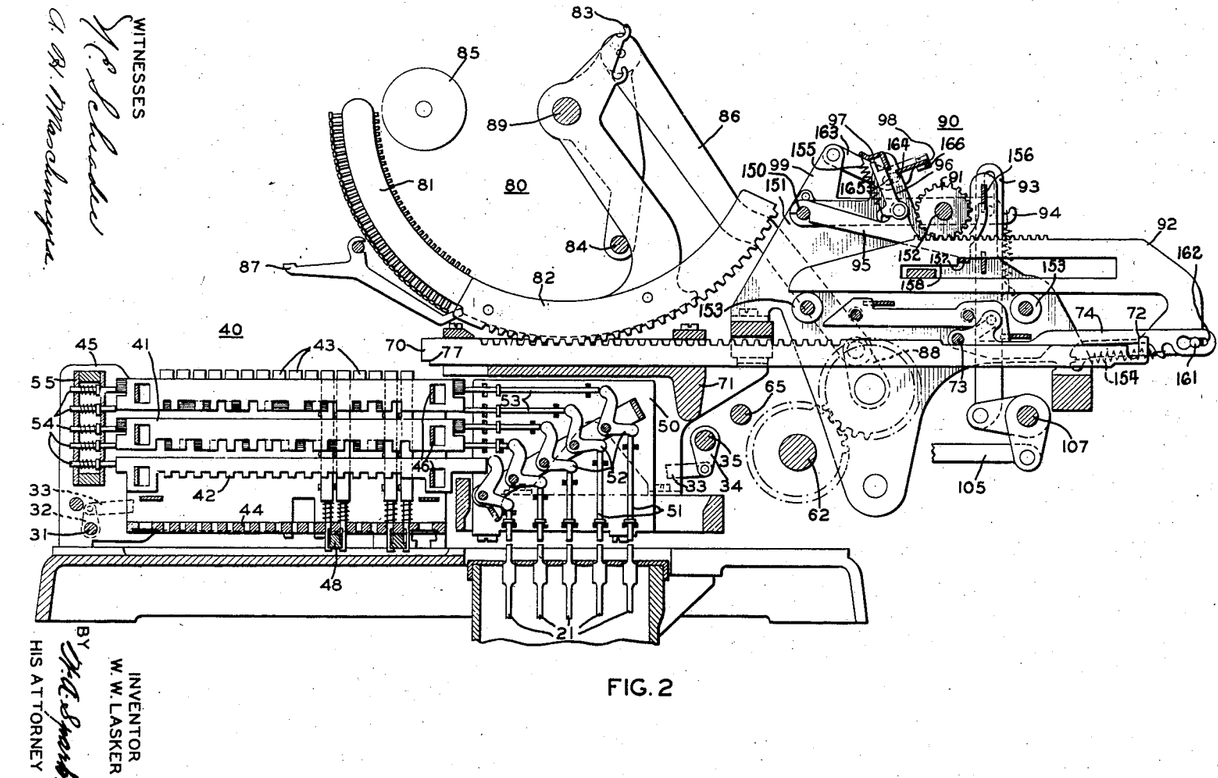
Fig. 2 is an enlarged sectional view of the invention showing the various mechanisms of a combined alphabetic and numeral type positioning and accumulating unit in normal position.

The type carrier is resiliently urged to rotate in a clockwise direction by a spring 83A (see Fig. 4) extended from an arm 83 of sector 81 to the frame of the machine in the usual manner, but is retained in its normal position, as shown in Fig. 2, by restoring bail 84. During each cycle of operation the bail 84 is oscillated in a well known manner by means of a link 86 pivoted to crank 88 fixed on a shaft which is rotated in a counter-clockwise direction by drive shaft 62. The gear sector 82 is designed to mesh with a rack element 70 that is slidably mounted in grooves cut in plate 71. Thus, the arcuate motion of the type carrier is utilized to transmit horizontal motion to rack 70. During an accumulating cycle, the type carrier follows the bail 84 forwardly until its associated rack is impeded by one of the stop bars 43. The bail continues under the control of shaft 62 to the end of its forward movement and on its return urges the type carrier and associated rack to normal position. Shaft 62 of the computing component and shaft 19 of the base component are synchronously driven from the main drive shaft (not shown) by means of a bevel gear arrangement, in a manner well known in Powers tabulators and disclosed in the patent to W. W. Lasker et al., No. 2,124,177, issued July 19, 1938.

Both shafts make one complete revolution during each and every cycle of operation of the machine.

Stop basket mechanism

Figure 3:
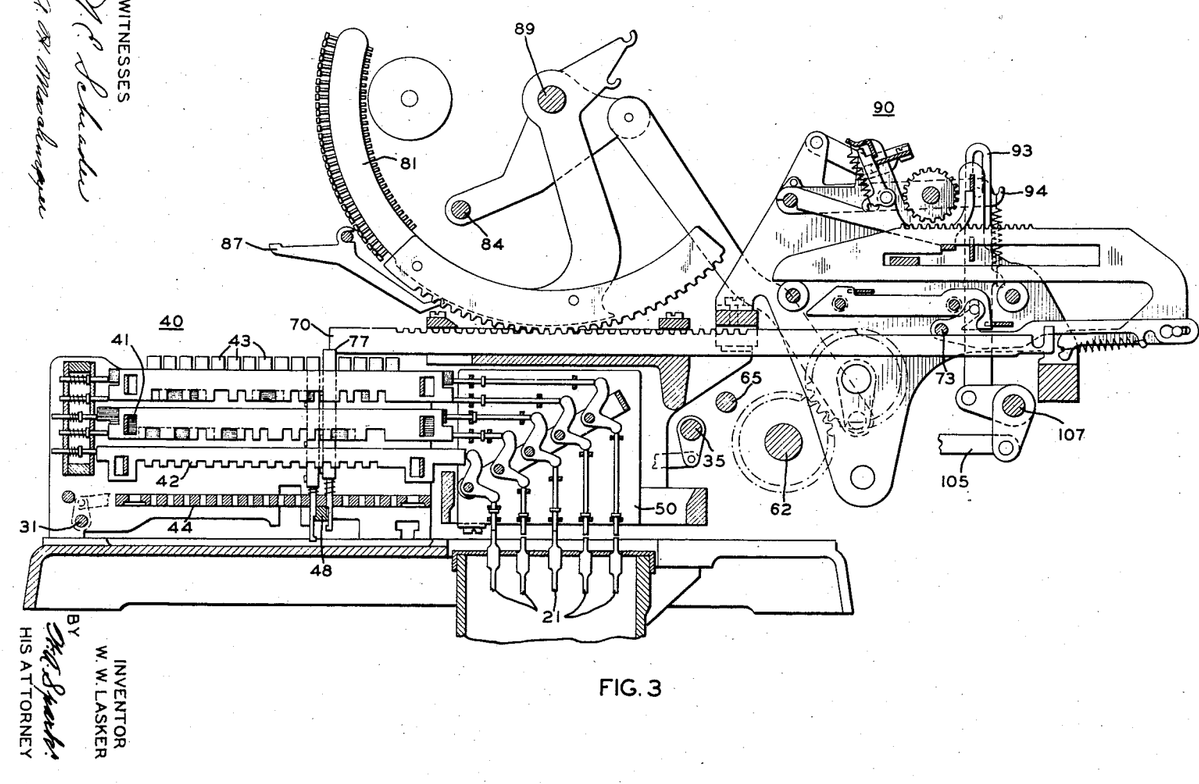
Fig. 3 is a sectional view similar to that of Fig. 2, but discloses the relative positions of the various mechanisms at a time immediately prior to the mid-point of a cycle of operation after an alphabetic character has been sensed.
Figure 6:
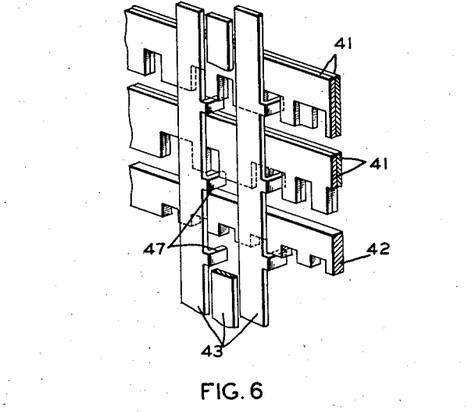
Fig. 6 is an isometric showing of the cooperation of the stop bars with the code and control bars.

The stop basket mechanism 40 (Fig. 2) consists essentially of code bars, stop bars 43 and a vertically reciprocable plate 44. The stop basket frame is made up of a pair of vertical side plates 45 connected by a series of transverse bars 46 which also serve to guide and support a plurality of sets of notched code bars. In the form of the invention disclosed in Figs. 1 to 4 inclusive, a set of code bars consists of four variably notched bars 41 and a fifth uniformly notched control bar 42. The variably notched bars are arranged in pairs in vertical alignment with the associated control bar as shown in Fig. 6. The bars 41 are of the well known permutation type whereby a single element, of a plurality of elements cooperating therewith, may be allowed a free path through the notches therein according to the particular setting thereof. The manner of notching of the several permutation bars may be by any arbitrary arrangement. Acting in conjunction with each set of code bars is a set of sixteen resiliently urged stop bars 43, each of which is provided with three turned over lugs 47 that are capable of cooperating with the lower edges of the code and control bars. The control bar 42 is so notched that when it is in its undisplaced position (Fig. 4), a stop bar may travel upwardly an extent equal to the depth of the notches in the code bars 41. When the control bar is in its displaced or forward position (Fig. 3), the lower edge thereof limits the upward travel of the stop bar to an extent equal to half the depth of the notches in the code bars. By this means the forward motion of rack 70 may be arrested by any stop bar in either of two positions, that is, when fully raised, a stop bar bears against the forward face of the rack (Fig. 4); when raised to its intermediate position, the stop bar does not affect the forward motion of the rack until the rack has progressed a half step further whereat the stop bar bears against a stepped portion 71 formed thereon (Fig. 3). Therefore, it will be seen that it is possible to selectively set for actuation any one of sixteen stop bars 43 by means of code bars 41 and further, to govern the extent of such actuation by means of control bar 42 and thereby position the rack 70 so that any one of the thirty-two types on the type carrier geared thereto may be placed in printing position. The alphabetic range of stops in the stop basket consists of the first eleven (counting from right to left in Fig. 2) stop bars when in either their fully raised or intermediate position and the twelfth bar when fully raised, whereas the numerical range consists of the twelfth bar in its intermediate position and the remaining four bars in either position.

Figure 7:
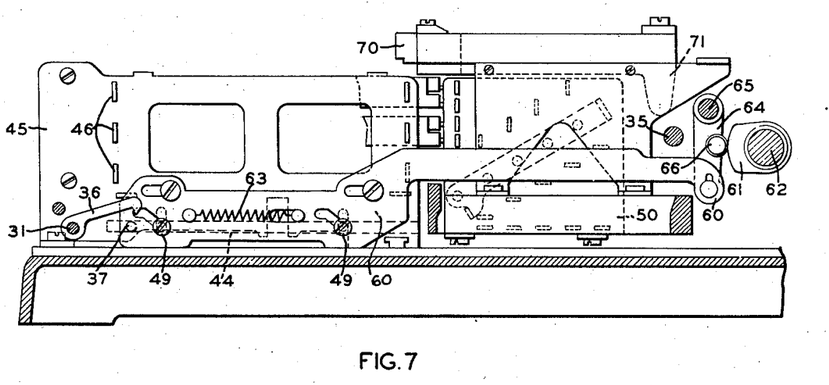
Fig. 7 is a side elevation of the several frames of the various mechanisms and illustrates the stop bar controlling mechanism.

The lower ends of stop bars 43 are constructed to pass freely through perforations in a vertically reciprocable plate 44 and engage with inverted T-shaped bars 48 rigidly fixed to said plate and arranged transversely thereto (Fig. 2). Four horizontal studs 49 (Fig. 7) two on each side of plate 44, pass through vertical slots in side plates 45 and also into inclined cam slots in slides 60. As a result, when slides 60 are moved rearwardly, plate 44 is moved upwardly a distance equal to the vertical component of the inclined cams. The slides are suitably guided by studs on the side plates 45 and are urged rearwardly by springs 63 extended between studs on the slides and studs fixed to the side plates as shown in Fig. 7. A rearwardly extending arm on each slide is pivoted to a lever 64 loosely mounted on shaft 65. A follower 66 on lever 64 cooperates with cam 61 fixed to drive shaft 62 to urge slide 60 forwardly against the tension of its spring 63.

When the machine is in its normal position, as indicated in Fig. 2, the base plate 44 is held in its lowermost position by cam 61 and the stop bars 43 are held retracted by transverse bars 48 so that the turned over lugs 47 on the stop bars are clear of the code bars and allow a free movement thereof. During an accumulating cycle the follower 66 (Fig. 7) will pass off the high dwell of cam 61 and allow slides 60 to be moved rearwardly by springs 63 immediately after the code bars have been positioned. The plate 44 is then moved upwardly, the studs 49 thereon being guided by the vertical slots in the side plates 45. All the stop bars 43 are then free to move upwardly under pressure of their respective springs. Only one will be elevated however, since the remaining fifteen will be restrained by the contact between either of the turned over lugs 47 thereon and the lower edges of code bars 41.

The change of direction mechanism mounted in frame 50 (Fig. 2) is essentially a modified bell crank arrangement whereby the vertical motion of translator wires 21 may be converted to horizontal motion and imparted to the code bars. Vertical tray pins 51, suitably guided by transverse bars rigidly fixed in the frame, transmit the upward movement of their respective translator wires to bell cranks 52 pivotally mounted in the frame. The bell cranks in turn act on horizontal tray pins 53, the forward ends of which bear against the code bars. The code bars are resiliently urged to normal or rearward position by spring-pressed pins 54 slidably mounted in pin box 55 which in turn is rigidly mounted between the side plates of the stop basket frame.

Operation of type positioning mechanism

When card perforations representing an alphabetic character have been sensed and the code bars set in accordance therewith (Fig. 3), the follower 66 passes off the high dwell of cam 61 and allows the plate 44 to rise, thereby positioning the stop bar for which a path has been cleared. During the interval in which a stop bar is being positioned, restoring bail 84 is moved slightly to the rear by crank 88, urging the type carrier and its associated rack therewith and then begins its forward travel. The spring urged sector 81 follows the bail forwardly until the rack 70 is impeded by the stop bar that has been raised. A type on the sector, corresponding to the coded perforations of the record, is then in printing position. Immediately prior to the completion of the forward sweep of bail 84, a linkage (not shown) connected thereto causes the firing of a printing hammer mechanism (not shown) that has been set for operation by the printing hammer enabling lever 87. The printing hammer mechanism and associated devices are well known in the art and, since they do not form a part of the present invention, are not described herein. Immediately before the return motion of bail 84 has urged the type sectors and associated racks to their normal position, follower 66 (Fig. 7) rides onto the high portion of cam 61 and causes the lowering of plate 44 and consequent lowering of the stop bars.

Operation of totalizer mechanism

Figure 4:
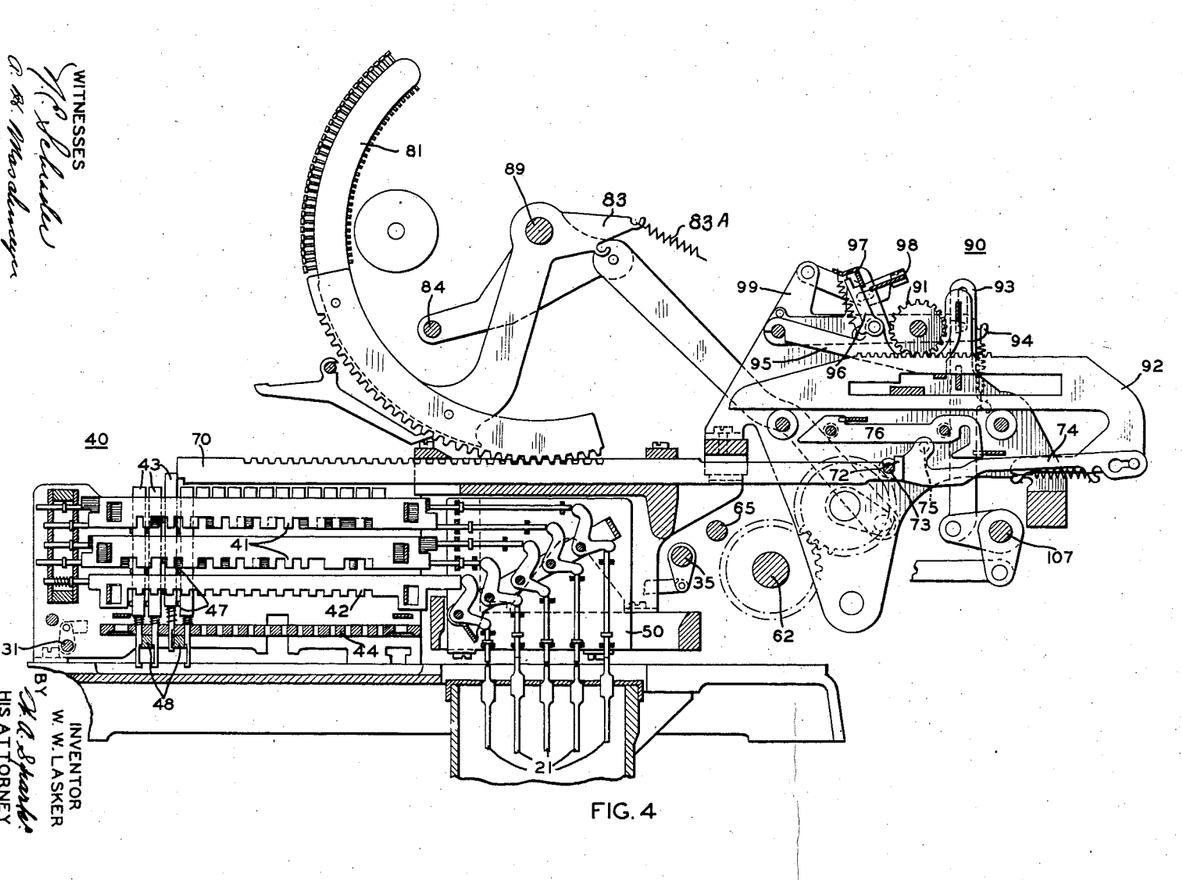
Fig. 4 is a sectional view similar to that of Fig. 2, but discloses the relative position of the various mechanisms at a time immediately subsequent to the mid-point of a cycle of operation after a numerical character has been sensed.

When card perforations representing a numerical character have been sensed, the mechanisms described above operate in the same manner but, in addition thereto, means are provided to accumulate the number in a totalizer 90. To perform this function, the rearwardly extending portion of rack 70 is provided with a latch element 72 (Fig. 4). The rack 70 is so constructed that when, during its forward travel over the stop bars, its forward face passes from the alphabetic to the numerical range, an auxiliary rack 92 is actuated by means of link 74. The link is joined by a spring and pin-in-slot connection to the auxiliary rack and is provided with a stud 73 designed to be engaged by latch 72. When the latch engages stud 73, a forward motion is imparted to link 74 and another stud 75 thereon travels down an inclined cam face on stationary cam 76 and forces stud 73 into the recessed portion of latch 72 and locks the racks to each other as it rides along the lower horizontal face of the stationary cam 76. The auxiliary rack will then advance forwardly a distance equal to the thrust of the forward face of rack 70 into the numerical range. The construction of the various elements is such that the pitch of a tooth on the auxiliary rack 92 is equal to the depth of the stepped portion 77 on rack 70 and also is equal to one half the distance between homologous edges of adjacent stop bars 43. Therefore the number of teeth on the auxiliary rack that pass the center line of the totalizer wheel 91 is the equivalent of the digit sensed. When rack 70 is moved rearwardly by the return movement of bail 84 it carries the auxiliary rack with it until stud 75 rides up the inclined cam face of a pendant extension at the rearward extremity of stationary cam 76. Stud 73 is thereby lifted from latch 72, disengaging the auxiliary rack 92 from rack 70 and rack 70 continues independently to its normal position. Fig. 4 illustrates the relative position of the various mechanisms at a time immediately subsequent to the mid-point of a cycle of operation after perforations representing the numeral "4" have been sensed.

Totalizer control mechanism

Figure 5:
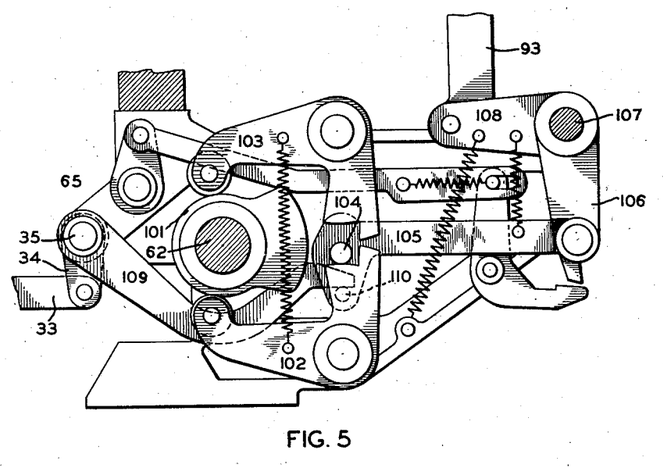
Fig. 5 is a side elevation, partly in section, of a type of totalizer engaging control mechanism that may be used in conjunction with the present invention.

Immediately preceding the forward movement of rack 70 during an accumulating cycle, the totalizer wheels 91 are disengaged from the rack 92 by a totalizer controlling mechanism of the type illustrated in Fig. 5. This device is well known in the art and its operation is completely disclosed in French Patent No. 719,524 and in the above cited Patent No. 2,124,177. Therefore, a brief résumé will suffice for the purposes of this description. Referring to Fig. 5, a cam 101 fixed to drive shaft 62 is arranged to rock bell cranks 102 and 103 during a single revolution of the shaft. A stud 104, capable of being engaged by either of the latch elements formed on the vertical arms of said bell cranks, is fixed to the forward end of spring urged pitman 105, the rearward end of which is pivoted to an arm 106 fixed to shaft 107. Shaft 107 extends across the rear of the machine and is provided with a plurality of pairs of arms 108. These arms are rigidly fixed to the shaft and a pair is provided for each rear totalizer with which the machine is equipped. An arm 109, fixed to rock shaft 35, extends rearwardly and bears upon a stud 110 on the pitman to hold the pitman in its lowermost position during an accumulating cycle. The timing of this mechanism is such that immediately preceding the forward sweep of bail 84, the bell crank 102 is rocked in a counter-clockwise direction by cam 101 and, in turn, rocks shaft 107 clockwise by means of pitman 105 and arm 106. This motion serves to elevate links 93, pivoted on arms 108, and thereby raise the rearward end of levers 94 on which the totalizer wheels 91 are mounted. The totalizer remains disengaged until the bail 84 has started its rearward travel. Before the bail engages the type carriers, the follower of bell crank 102 passes off the high dwell of cam 101 and allows each totalizer wheel to reengage with its auxiliary rack 92, so that the return stroke of an auxiliary rack rotates the associated wheel through a number of tooth spaces equal to the digit sensed. The totalizer is engaged and disengaged in the above mentioned manner during every revolution of shaft 62 whether the character sensed be numeral or alphabetic. However, in the case of an alphabetic character this motion will be an idle one since the totalizer actuating rack 92 will not have been moved forwardly by rack 70.

During a total taking operation it is necessary to reverse the timing of an accumulating cycle, that is, to engage the totalizer with its actuating rack on the forward stroke of bail 84 and disengage the totalizer on the return stroke of the bail. To accomplish this, the shaft 35 is rocked counterclockwise in a manner to be described hereinafter. The arm 109 is then rocked to allow the spring urged pitman 105 to move upwardly so that stud 104 is in position to be engaged by bell crank 103. As shaft 62 rotates it will be seen that the desired reversal of timing is effected.

Totalizer mechanism

Any suitable adding device may be combined with the foregoing mechanisms to accumulate numerical quantities. The type shown herein is similar in construction and in operation to those employed in Powers tabulators now in general use and is a modification of the type disclosed in copending application S. N. 681,333 filed December 10, 1923. The mechanism includes a pair of levers 94 (Fig. 2), pivotally mounted on a transverse shaft 150 journaled at each end in suitable frame plates 151. The rearward ends of levers 94 are joined by a spring and pin-in-slot connection to the upper ends of links 93 of the totalizer control mechanism. Supported between levers 94 is a transverse shaft 152 on which are mounted the totalizer wheels 91 of the adding mechanism. Associated with each wheel 91 is an actuating rack 92, slidably mounted on rollers 153 and urged rearwardly by a spring 154 connected to link 74.

For effecting transfers in this type of mechanism, each wheel 91 is provided with a lever 95, pivoted at its forward end on shaft 150. Each lever 95 is urged upwardly by a spring 155 extended between a comb piece 97, mounted in frame plates 151, and the forwardly extending tail on a pawl 96 that is pivoted on lever 95 and has a rearward edge which normally bears against a bent-over portion of the comb piece. The upward movement of each lever 95 is limited by a transverse bar 156, mounted in frame plates 151, that coacts with an upturned portion of each lever. In addition, each lever 95 is provided with a turned-over ear 157 that is arranged to engage a shoulder 158 on the actuating rack 92 associated with the adjacent totalizer wheel of higher order.

When an actuating rack 92 is moved rearwardly during the latter portion of each accumulating cycle, ear 157 on the lever 95, associated with the adjacent accumulator wheel of lower order, is resiliently held in the path of shoulder 158, due to the tension of spring 155, and serves to limit the rearward movement of the rack. If, however, the accumulator wheel of lower order has been rotated from "9" to "0" during the same cycle, the usual transfer stud thereon (not shown), associated with the zero tooth of the wheel, coacts with a cam surface (not shown) on the lever 95 and serves to depress the rearward end of the lever sufficiently to move ear 157 out of the path of shoulder 158. As lever 95 is depressed, pawl 96 is lowered to permit a shoulder thereon to snap under the bent-over portion of comb piece 97, due to the action of spring 155, whereby lever 95 is retained in depressed position. Thus, ear 157 is held out of the path of movement of shoulder 158 and rack 92 moves rearwardly until a pin 161 thereon contacts the end of the slot 162 in link 74. The additional distance so traveled by the rack is equal to the pitch of a tooth on wheel 91 and, therefore, the totalizer wheel is rotated through an additional tooth space to effect the necessary transfer.

To restore the mechanism to normal position after a transfer has been effected, the forward end of each lever 94 is provided with an upwardly extending arm 99 to which is connected a link 163 having a cam slot 164 encompassing a stud 165 mounted in frame plate 151. Supported between the rearward ends of links 163 is a transverse bar 166 on which is adjustably mounted a bail bar 98 arranged to coact with pawls 96. When levers 94 are rocked counter-clockwise during the initial portion of the succeeding accumulating cycle, arms 99 are also rocked counter-clockwise and serve to pull links 163 forwardly to urge bail bar 98 against any pawls 96 that have snapped under comb piece 97. Pawls 96 are thereby forced out of engagement with comb piece 97 and the associated levers 95 are then free to be returned to their upper positions when the racks 92 are moved forwardly. After rack 92 moves forwardly a distance equivalent to the pitch of one tooth on wheel 91, ear 157 is clear of the lower edge of shoulder 158 and lever 95 is returned to its original position by spring 155. Ear 157 is then in position to limit the movement of rack 92 as above, when the rack is returned.

*Description of totaling cycle*

A totaling cycle may be initiated in a tabulator equipped with combined type positioning and accumulating units of this kind by inserting a space card and a total card at the end of a sequence of item cards. The space card serves to reset any tripped transfer mechanisms and restore the associated actuating racks 92 to normal position. The total card serves to initiate the operation of the total taking mechanism.

In the particular arrangement of permutation bar notches used herewith and conventionally disclosed in the drawings there is an unobstructed path for the twelfth stop bar when the mechanism is in the normal position, that is, when no translator wires 21 have been raised (Fig. 2). Thus, a column in a record card, devoid of perforations, will effect the elevation of the twelfth stop bar to its highest position. The space card referred to above is completely blank in the item fields and consequently would cause the positioning of a "0" by every type sector. A spacing cycle is in form an accumulating cycle in that the totalizer wheels 91 are disengaged from the actuating racks 92 during the forward stroke of racks 70 and engaged during their return. The rack 70 is so constructed that the latch 72 thereon engages stud 73 of link 74 when the forward face of the rack passes the mid-point of the eleventh stop bar 43. When an actuating rack 92 has not previously been moved rearwardly by the action of the transfer mechanism of the adjacent totalizer wheel of lower order, the subsequent movement of the forward face of rack 70 from the mid-point of the eleventh stop bar to the rearward face of the twelfth stop bar would merely serve to advance link 74 so that the rearward end of the slot therein would contact the pin on rack 92. If, however, the rack 92 has been moved rearwardly, the pin thereon would be at the rearward end of the slot in link 74 and the above mentioned movement advances the rack a distance equivalent to pitch of one tooth on wheel 91 and allows lever 95 to latch the rack in this position.

The usual total card, containing a single perforation in the forty-fifth column, may be used herewith to effect the initiation of the operation of the total taking mechanism. This mechanism is a standard part of the Powers tabulator now in general use and is completely described in the above mentioned Patent No. 2,044,119. A detailed description of this device does not appear to be necessary in the present case and it will suffice to state that a link 23 (Fig. 1) is pulled downwardly during a total taking cycle. This motion serves to rock shaft 31 in a clockwise direction through an obvious linkage. Fixed on shaft 31 is an arm 32 (Fig. 2) and a plurality of latch elements 36 (Fig. 7). Pivoted to arm 32 (Fig. 2) is a link 33 which is connected at its rearward extremity to an arm 34 fixed on shaft 35. When shaft 31 is rocked, shaft 35 will be rocked in a counter-clockwise direction and raise arm 109 (Fig. 5) fixed thereto to effect the reversal of the timing of the totalizer engaging mechanism referred to hereinabove. Since the total card is unperforated except in the forty-fifth column, it also tends to effect the elevation of the twelfth bar of every set of stop bars 43. Such an occurrence would obviously prevent the yielding of a total. Therefore the latches 36 have been provided to disable the stop bars. When shaft 31 is rocked, each latch engages a stud 37 on slides 60 before the followers 66 pass off the high dwell of cams 61. The slides 60 are then held in their forward position and do not elevate plates 44. Consequently all the stop bars of every set are held in retracted position. As the bails 84 are actuated by shaft 62 the racks 70 are then free to move forwardly until the associated totalizer wheels are rotated to zero position, whereat one of the transfer studs on each wheel bears against a stopping element on levers 95. A type on each type carrier, corresponding to the quantity registered by the associated totalizer wheel, is then in printing position. The resulting number, when printed, represents the total of the numerical items previously tabulated. Before the racks are restored by bails 84, the totalizer wheels are disengaged from the actuating racks and remain at zero so that a new set of numerical items may be accumulated therein.

*Increasing capacity of stop basket*

Figure 8:
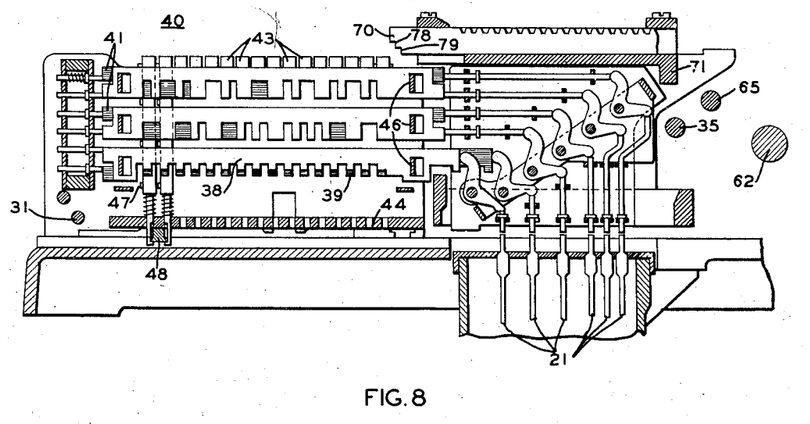
Fig. 8 illustrates the essential modifications necessary to increase the capacity of the stop basket mechanism.

The description thus far has been confined to the operation of the mechanism in accordance with a five unit permutation code utilizing five perforation positions in either the upper or lower zone of a 90 column card. The sixth perforation position is then available for various control purposes. Should it become desirable to have a type carrier equipped with more than thirty-two characters, a six unit code may be employed to increase the capacity of the unit. In this case all six perforation positions in a card zone are required and the control bar 42 of Fig. 6 is replaced by two control bars 38 and 39 as shown in Fig. 8. The notching arrangement on these bars may be similar to that of the bar 42 except that the depth of the notches in control bar 38 is equal to one-third the depth of those on the code bars 41, and the depth of the notches on control bar 39 is equal to two-thirds the depth of those on the code bars. Thus, it will be seen that when both control bars are in their undisplaced position, a stop bar may be raised the full extent of the notches in the code bars. When control bar 38 is displaced a stop bar is limited to two-thirds of such movement. Displacement of bar 39 limits the upward travel of a stop bar to one-third the depth of the notches in the code bars. In this case the rack 70 is provided with two shoulders 78 and 79 that are designed to cooperate with the stop bars when raised to either intermediate height. When this modification is employed and the other mechanisms are adjusted to conform thereto, it is possible to stop the rack 70 in any one of forty-eight possible positions and thereby position type carrier 81 accordingly.

Throughout this application the description has been confined to the operation of a single type carrier and the associated mechanisms and controls. This procedure has been followed to eliminate unnecessary duplication and resulting confusion in the drawings. It will be tacitly understood that the number of type carriers that comprise any unit, and further, the number of units that may be incorporated in a standard Powers tabulator, is entirely arbitrary and is governed solely by the requirements of various accounting systems.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a record controlled tabulating machine, in combination, a stop basket, said stop basket having a plurality of stops arranged in two groups, means to render effective any one of said stops during each tabulating cycle of said machine, a type carrier positioning element arranged to traverse said groups of stops and capable of cooperating with any effective stop, a totalizer actuating rack operable with said positioning element, and means to cause said actuating rack to operate with said positioning element when said positioning element passes from the first of said groups of stops to the second of said groups of stops and to continue the operation of said actuating rack during the period in which said positioning element is traversing the second group of stops.

2. In a record controlled tabulating machine, in combination, a type carrier having alphabetic and numeral type arranged thereon, a reciprocable type carrier positioning element for placing any type in printing position, a plurality of stops arranged in two groups in the path of movement of said positioning element, each stop of said first group being arranged when effective to control said positioning element to place an alphabetic type in printing position, each stop of said second group being arranged when effective to control said positioning element to place a numeral type in printing position, record controlled means to render any stop effective, a totalizer, an actuating rack operable by said positioning element for inserting amounts in said totalizer, and a lost motion connection between said actuating rack and said positioning element whereby said actuating rack is operated by said positioning element only when said positioning element is controlled by a stop in the second group of stops.

3. In a record controlled tabulating machine having a type carrier equipped with alphabetic and numeral type, means to position said type carrier to place any type in printing position, said positioning means including a reciprocable element geared to the type carrier, a totalizer for accumulating numerical quantities, actuating means for inserting amounts in said totalizer, and means to place said totalizer actuating means under the control of said reciprocable element only when a numeral type is placed in printing position, said last recited means comprising a lost motion connection between said totalizer actuating means and said reciprocable element.

4. In a record controlled tabulating machine, in combination, a type carrier having alphabetic and numeral type arranged thereon, a reciprocable type carrier positioning element for placing any type in printing position, a plurality of stops arranged in two groups in the patch of movement of the positioning element, each stop of the first group being arranged when effective to control the positioning element to place an alphabetic type in printing position, each stop of the second group being arranged when effective to control the positioning element to place a numeral type in printing position, record controlled means to render any stop effective, a totalizer, an actuating rack operable by the positioning element for inserting amounts in the totalizer, a lost motion connection between the positioning element and the actuating rack whereby the actuating rack is engaged by the positioning element when the positioning element passes from the first of said groups of stops to the second of said groups of stops, and means to maintain such engagement during the period in which the positioning element is traversing the second group of stops.

WILLIAM W. LASKER.